June 21, 1949.　　　　E. J. EGLE, JR　　　　2,474,042
VIBRATION ELIMINATING APPARATUS
Filed July 16, 1945
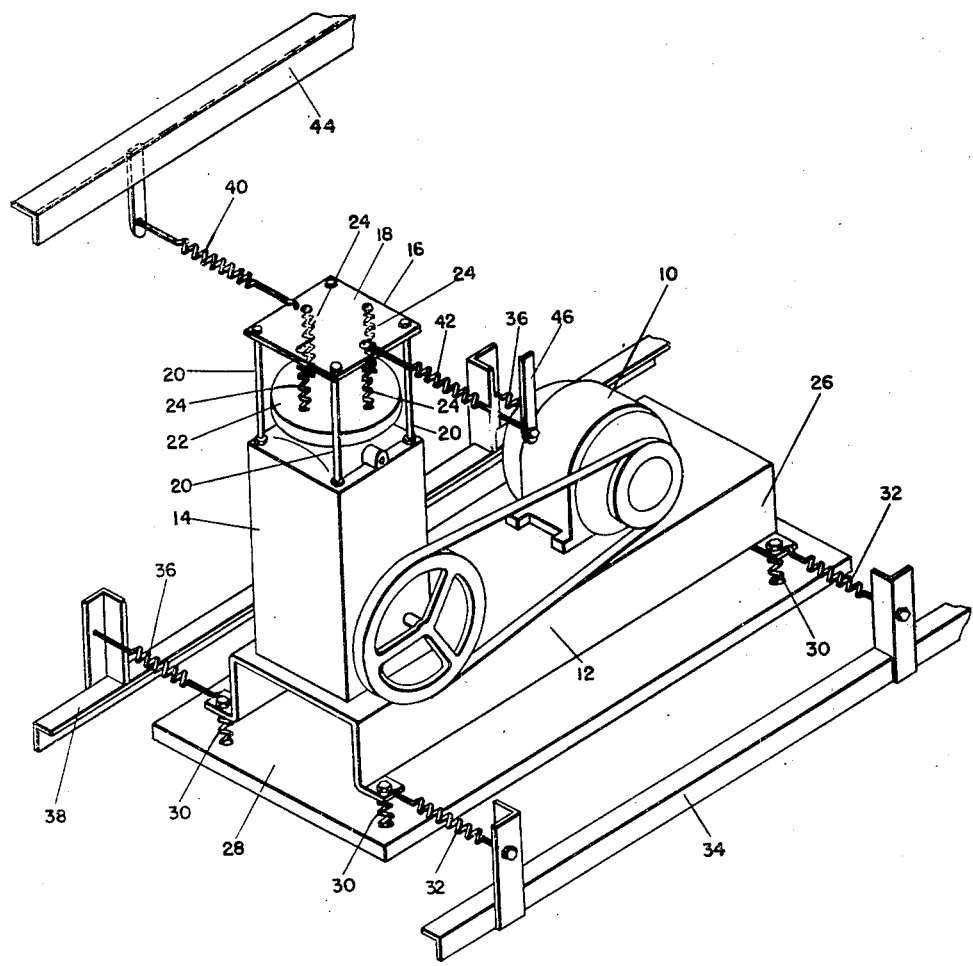
INVENTOR
EDWARD J. EGLE JR.
BY
ATTORNEY Patented June 21, 1949

2,474,042

UNITED STATES PATENT OFFICE 2,474,042

VIBRATION ELIMINATING APPARATUS

Edward J. Egle, Jr., Woodside, N. Y., assignor to the United States of America as represented by the United States Atomic Energy Commission Application July 16, 1945, Serial No. 605,365

4 Claims. (Cl. 103—218)

This invention relates to vibration eliminating apparatus and more particularly to apparatus for inhibiting the vibration of mechanisms including a reciprocating element, for example a pump or compressor having a reciprocating piston.

The problem to which the present invention is directed, namely the elimination of vibration of reciprocating machinery, is one of pervasive importance and is encountered in many different fields. Elimination of vibration is desirable both because of the harmful effect it may have on the vibrating machine itself and because of the fact that such vibrations may be transmitted through the floor or other support on which the machine is mounted to auxiliary or other equipment located near the machine. For example it may be necessary to use delicate measuring or control instruments at points located near the vibrating machine and vibrations may be transmitted to such instruments to an extent sufficient to cause permanent injury to the instruments or to prevent their effective use.

It is accordingly an object of the present invention to provide apparatus for eliminating or reducing the vibration of reciprocating machinery.

It is another object of the invention to inhibit transmission of the vibrations of reciprocating machinery to adjacent objects.

Other objects of the invention will be in part obvious and in part pointed out hereinafter.

As conducive to a clearer understanding of the present invention it may be pointed out that vibrations of reciprocating machinery are commonly due to a periodic force being exerted on the machine by a reciprocable element thereof. The problem of eliminating vibration may therefore involve establishing a corresponding but oppositely acting periodic force. In accordance with the present invention such an opposing force is established by utilizing a weight having a predetermined mass that is attached to the machine by suitable resilient means. The mass of the weight and the resilience of the resilient means are so selected that the weight and resilient means have a vibratory period which is substantially the same as that of the vibratory period of the machine with which they are associated.

The many objects and advantages of the present invention may best be appreciated by referring to the accompanying drawing which illustrates a motor-compressor unit incorporating a preferred embodiment of the invention. Referring to the drawing the numeral 10 designates an electric motor which through a belt 12 drives a compressor 14 having a vertically arranged reciprocable piston (not shown). Mounted on the top of the compressor 14 there is a frame 16 comprising a plate 18 and four supporting legs 20. Depending from the plate 18 there is a weight 22 that is connected to the plate 18 by four springs 24. The springs 24 are arranged symmetrically about the axis of the compressor 14 to cause the weight 22 to be in axial alignment with the axis of the compressor and reciprocable with respect to the compressor.

The motor 10 and compressor 14 are mounted on the bed plate 26 which is in turn mounted on a fixed base 28. Interposed between the bed plate 26 and base 28 there are four springs 30 (only three of which are shown). In order to prevent undue lateral movement of the motor 10 and compressor 14 the motor-compressor unit and associated structural parts are resiliently connected to lateral supports. Thus the bed plate 26 is connected by the springs 32 to the fixed support 34 and by the springs 36 to the fixed support 38. In like manner the plate 18 is connected by the springs 40 and 42 to the fixed supports 44 and 46 respectively.

The operation of the vibration eliminating apparatus is apparent from the above description. The mass of the weight 22 and the resilience of the springs 24 are so chosen as to cause the weight and springs to have a vibratory period substantially equal to the vibratory period of the compressor piston. Thus the weight 22 will vibrate as the piston is reciprocated but will move in opposite phase with respect to the piston and substantially offset the force exerted on the compressor by the piston. The springs 30 serve to prevent any residual vibration from being transmitted to the base 28 and the springs 32, 36, 40 and 42 oppose any torsional tendency of the motor-compressor unit that might result from axial misalignment of the weight 22 and compressor 14.

The relationship between the weight 22 and springs 24 may be represented in general by the following expression:

$$N = \frac{60}{2\pi}\sqrt{\frac{K}{m}}$$

wherein $N$ = the revolutions per minute of the compressor, i. e. one half the number of strokes per minute of the reciprocating piston.

$K$ = the resultant longitudinal spring constant in pounds per inch of elongation. (Where as in the present case there are four springs, $K$ equals the sum of the spring constants of the individual springs.)

$m$ = the mass of the vibrating weight, that is its weight divided by the gravational constant 386 in./sec.$^2$.

When the resilience of the springs 24 and the mass of the weight 22 satisfy the above expression the vibratory period will be as indicated by the symbol $N$. The ratio of the resultant spring constant to the mass of the vibratory weight should be so chosen as to make the value of N for the spring-weight system substantially the same as the value of N for the compressor.

In the specific installation herein described the compressor 14 was a single-stage compressor having a 4½ inch bore and a stroke of approximately 2½ inches. The motor 10 was a two-horse power motor and operated the compressor at about 770 R. P. M. The spring constant of each of the four springs 24 was about 40 and a weight 22 of approximately 12 pounds was used. It was found that this combination of weight and springs substantially reduced vibration of the compressor. It was also found, however, that the auxiliary springs 30, 32, 36, 40 and 42 play an important part in achieving the desired freedom from vibration and transmission of vibration to adjacent objects. Thus if the springs 30 were omitted and the bed plate 26 mounted in fixed relationship to the base 30 the resiliently mounted weight substantially reduced vibration of the compressor 14 but did not completely eliminate it. It was found necessary to insert the springs 30 in order to prevent transmission of all vibrations to the base 28. It was further found that careful adjustment was required to obtain the necessary axial alignment of the weight 22 with respect to the compressor. In cases where the alignment was not precise there was a tendency for the motor-compressor unit to twist. The springs 32, 36, 40 and 42 tended to oppose this lateral movement of the unit and therefore permitted a less exact alignment of the weight 22 and compressor 14. The spring constants of the springs 30, 32, 36, 40 and 42 are not critical.

It will be understood that the present invention may be applied to machines other than the compressor specifically illustrated in the drawing and described above. In fact it may be applied to any machine having a reciprocating element provided that the frame 16 or its equivalent is axially aligned with the reciprocating element of the machine and provided that the strength of the springs 24 or their equivalent as well as the size of the weight 22 or its equivalent is carefully determined to produce a vibrating system that operates in an equal and opposite manner to the vibrations of the reciprocating element of the machine. The method of determining this proper relationship is indicated above.

Since many embodiments might be made of the present invention and since many changes might be made in the embodiment described, it is to be understood that the foregoing description is to be interpreted as illustrative only and not in a limiting sense.

I claim:

1. Vibration inhibiting apparatus for inhibiting the reciprocatory vibrations of a pump having a reciprocating piston comprising, in combination with said pump, a movable weight, first resilient means so interconnecting said pump and said weight that said weight is reciprocated and its axis of reciprocation is substantially coincident with the axis of reciprocation of said piston, second resilient means for supporting said pump and third resilient means connected to said pump and to a fixed lateral support for opposing lateral movement of said pump.

2. Vibration inhibiting apparatus for inhibiting the reciprocatory vibrations of a pump having a reciprocating piston comprising, in combination with said pump, a movable weight, first spring means so connected to said pump and said weight that said weight is reciprocated and its axis of reciprocation is substantially coincident with the axis of reciprocation of said piston, second spring means for supporting said pump and third spring means connected to said pump and to a fixed lateral support for opposing lateral movement of said pump.

3. Vibration inhibiting apparatus for inhibiting reciprocatory vibrations of a pump having a reciprocating piston comprising, in combination with said pump, a movable weight, a frame fixed to said pump and axially aligned with respect to said reciprocating piston, a plurality of springs interconnecting said weight and said frame to cause said weight to be reciprocated, said springs being symmetrically spaced from the axis of said reciprocating piston to cause the axis of reciprocation of said weight to be maintained substantially coincident with the axis of reciprocation of said piston, first auxiliary resilient means for supporting said pump and second auxiliary resilient means connected to said pump and to a fixed lateral support to oppose lateral movement of said mechanism.

4. Vibration inhibiting apparatus for inhibiting reciprocatory vibrations of a pump having a reciprocating piston comprising, in combination with said pump, a movable weight, a frame fixed to said pump and axially aligned with respect to said reciprocating piston, a plurality of springs interconnecting said weight and said frame to cause said weight to be reciprocated, said springs being symmetrically spaced from the axis of said reciprocating piston to cause the axis of reciprocation of said weight to be maintained substantially coincident with the axis of reciprocation of said piston, first auxiliary resilient means for supporting said pump and second auxiliary resilient means connected to said pump and to a fixed lateral support to oppose lateral movement of said mechanism, the resilience of said springs and said resilient means and the mass of said weight being so selected as to cause said weight to exert on said pump a force substantially equal and opposite to the force exerted by said reciprocating piston on said pump.

EDWARD J. EGLE, Jr.

REFERENCES CITED

The following references are of record in the file of this patent:

UNITED STATES PATENTS

| Number | Name | Date |
|---|---|---|
| 804,884 | Rutan | Nov. 21, 1905 |
| 1,638,782 | Paton | Aug. 9, 1927 |
| 1,792,493 | Hallett | Feb. 17, 1931 |
| 1,855,570 | Edison | Apr. 26, 1932 |
| 1,867,708 | Paton | July 19, 1932 |
| 1,995,620 | Monroe | Mar. 26, 1935 |
| 2,271,976 | Hasbrouck et al. | Feb. 3, 1942 |